Nov. 7, 1933.     H. S. BEST     1,933,698
SPROCKET
Filed Aug. 8, 1930    2 Sheets-Sheet 1
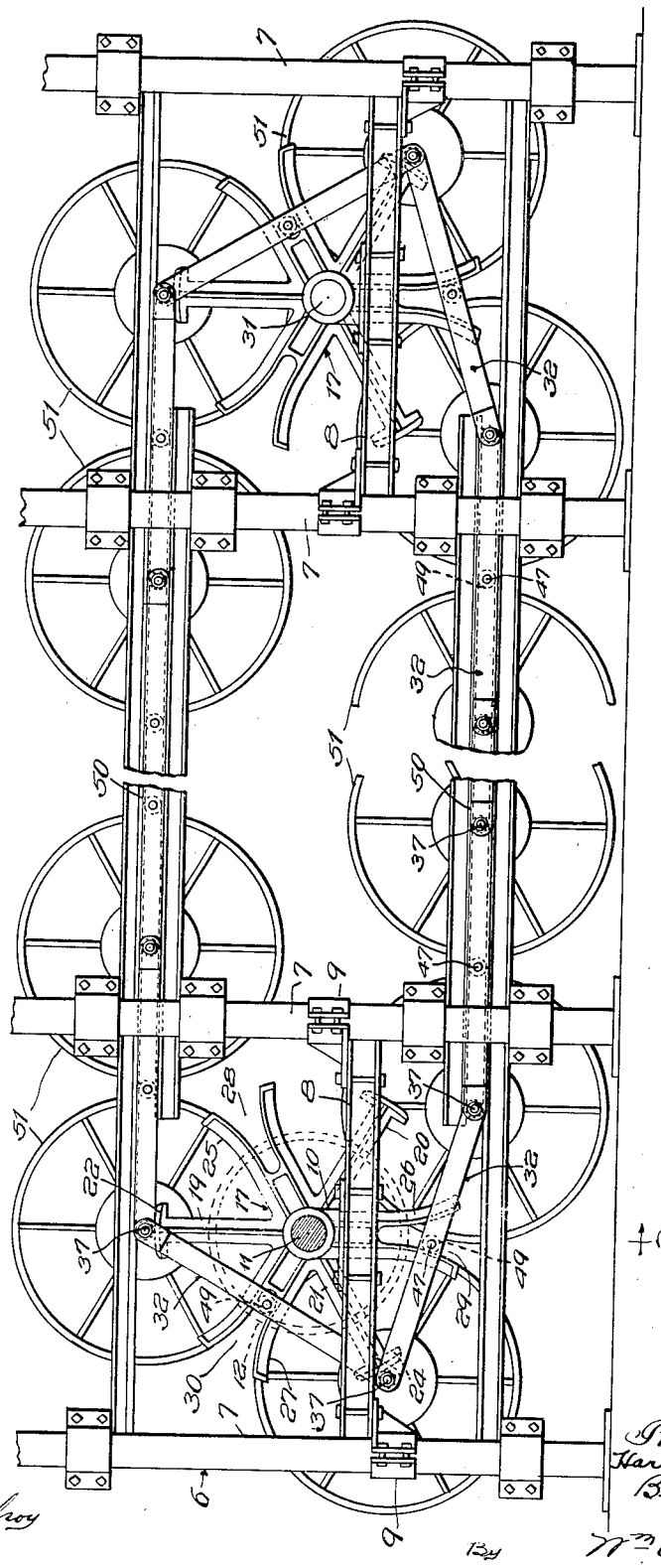

Nov. 7, 1933.  H. S. BEST  1,933,698
SPROCKET
Filed Aug. 8, 1930   2 Sheets-Sheet 2
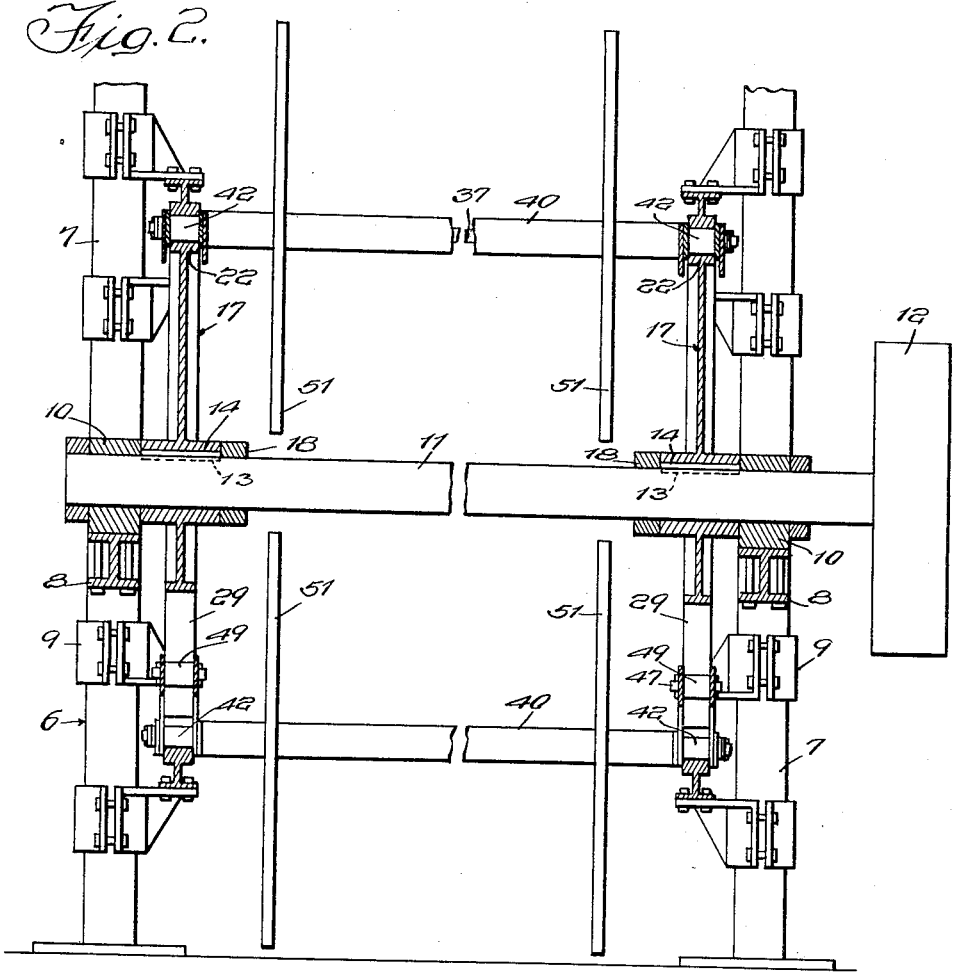
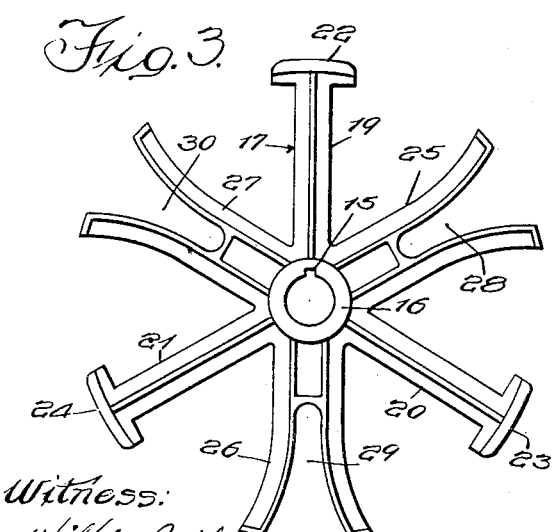
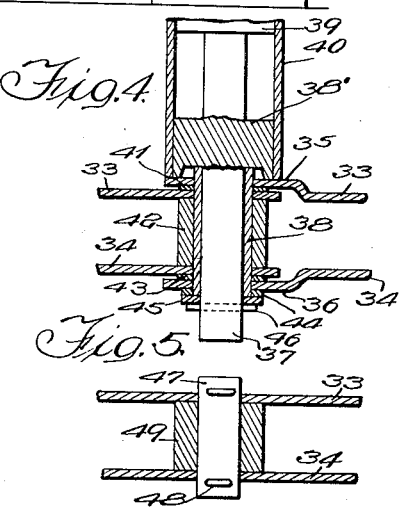

Patented Nov. 7, 1933

1,933,698

UNITED STATES PATENT OFFICE 1,933,698

SPROCKET

Harry Sumner Best, Galva, Ill., assignor to John H. Best & Sons, Galva, Ill., a firm composed of Charlotte Sumner Best, Don Jewell Best, Leon Henson Best, and Harry Sumner Best, Galva, Ill.

Application August 8, 1930. Serial No. 473,852

1 Claim. (Cl. 74—31)

This invention relates to certain novel improvements in sprockets, and among the salient objects are to provide a sprocket about which the chain may pass in a manner which will require a minimum amount of space; in which the driving connection between the chain and sprocket is made at substantially the medial portion of the links rather than at the interconnections between the links; to provide a sprocket that may be used in connection with a chain embodying links of simple construction that may be interconnected to provide a chain in a simple and inexpensive manner.

A selected embodiment of the invention is illustrated in the accompanying drawings, and therein Fig. 1 is a side elevation of a machine with which a selected embodiment of my invention is associated;

Fig. 2 is a sectional view taken substantially on the line 2—2 on Fig. 1;

Fig. 3 is an elevation of a selected form of construction for my sprocket;

Fig. 4 is a sectional view showing the interconnection between the links of the chain cooperating with the improved sprocket; and Fig. 5 is a sectional detail view illustrating the manner of mounting the driving roller between the links of the chain.

I have illustrated my invention in connection with a rack embodying a frame, generally indicated by 6, and including uprights 7, suitably joined together. Between adjacent uprights 7 at each end of the frame are I-beams 8, or other suitable supporting members which are retained in position by suitable clamp structures 9 secured on the uprights 7. As best illustrated in Fig. 2, I-beams 8 are provided on each side of the machine, and mounted on I-beams on opposite sides of the machine are bearing structures 10 (Fig. 1) in which a shaft 11 is journaled. On the shaft 11 is a power-receiving pulley 12 or other suitable power-receiving means, and the shaft 11 constitutes the driving shaft for the improved mechanism. In the shaft 11, adjacent to and inwardly of the bearings 10, are keyways 13 to receive keys 14, which keys also seat in keyways 15 in the hub 16 of my improved sprocket, generally indicated by 17, and it is in this manner that sprocket 17 may be mounted on the shaft 11 adjacent the sides of the frame to be rotatable with the shaft, collars 18 being secured on the shaft 11 inwardly of the sprockets to retain the hubs of the sprockets in engagement in the bearing portions 10, and to prevent axial movement of the sprockets on the shaft. Extending from the hub 16 of the sprocket 17 are radial arms 19, 20 and 21 which are preferably spaced at 120° intervals. At the outer ends of the arms 19, 20 and 21, at what constitutes the periphery of the sprocket, are enlarged pads 22, 23 and 24. Extending from the hub 16 in diametrical opposition to the arms 19, 20 and 21, are arms 25, 26 and 27, and the outer ends of these arms are bifurcated, as indicated at 28, 29 and 30, the bifurcations being flared at the outer ends thereof so that the openings thereinto are of greater size than the inner portions thereof. In the device, as illustrated in Fig. 1, an arrangement such as the foregoing is provided at the rear end of the machine, except that the shaft 11 is supplanted by a shaft 31 which is journaled in bearing portions 10 but which is not provided with power-receiving means so that the shaft 31 constitutes but an idler shaft and the sprockets mounted thereon are idler sprockets. The chain which cooperates with the sprocket 17 is formed from links, generally indicated by 32. Each of the links 32 comprises straps 33 and 34. As best illustrated in Fig. 4, the straps 33 and 34 include portions 35 and 36 offset from the main extent of the straps. To interconnect the straps of the links, shafts, such as 37, are provided, and these shafts extend across the machine and are slightly longer than the distance between the outer edges of the sprockets 17. The manner in which the straps of the links are interconnected to these shafts is illustrated in Fig. 4, and therein it will be seen that a sleeve 38 is disposed around the shaft 37 adjacent the end thereof. At the inner end of the sleeves 38 a spacing collar 38' which is disposed about the shaft 37, and other spacing collars 39 are arranged at intervals along the shaft 37, and about these spacing collars and in engagement with the periphery thereof is a bearing sleeve 40. The offset portion 35 of one of the straps 33 has an opening therein. This strap 33 is arranged on the shaft 37 with the sleeve 38 extended through the opening in the offset portion 35 thereof, and the offset portion 35 is engaged with the end of the sleeve 40 in such a manner that the main extent 33 of the link is offset away from the end of the sleeve 40. A washer 41 is engaged with the offset portion 35 about the sleeve 38. The strap 33 of the next link has an opening therein at the end thereof opposite the offset portion 35 thereof, and this link 33 is next disposed with the bearing sleeve 38 in the opening therein. A spacing collar 42 is next arranged about the bearing sleeve 38 and it will, therefore, be seen that opposite ends of straps 33 of adjacent links 32 are connected together for pivotal movement about a bearing sleeve on the shaft 37. In the end of the strap 34, of the link 32 including the strap 33 last connected to the bearing sleeve 38, there is an opening and the bearing sleeve 38 is arranged in this opening with the end of the link 34 abutting the end of the spacing collar 42. A washer 43 is next disposed about the bearing sleeve 38 outwardly of the strap 34. In the offset portion 36 of the strap 34 of the link 32 which was first connected to the bearing sleeve 38, is an opening, and the bearing sleeve 38 is arranged in this opening with the offset portion 36 abutting the washer 43, and the offset portion 36 is arranged opposite to the offset portion 35. The washers 41 and 43 are of a thickness equal to the amount of offset of the portions 35 and 36 from the extent of the straps 33 and 34, and therefore the straps 33 and the straps 34 of adjacent links 32 will be aligned. Outwardly of the offset portion 36 there is a washer 44, and outwardly of the washer 44 and the end of the bearing sleeve 38 a ring 45 is disposed about the shaft 37, and a pin or cotter key, or other suitable retaining device 46 is extended through the shaft 37 to retain the ring 45 in position. An arrangement similar to the foregoing is provided at the interconnection of each of the links 32 at both ends thereof, and in this manner an endless chain is formed, and this chain is disposed to pass about sprockets 17 arranged on the same side of the machine at opposite ends thereof. The width of the pads 22, 23 and 24 is substantially equal to the length of the spacing collar 42, and the chain is disposed on the sprockets with, for example, the spacing collars 42 at opposite ends of a link 32 seated on the pads 22 and 24 of one of the sprockets, as illustrated at the left hand end of Fig. 1. At the medial portions of each of the links 32 between the straps 33 and 34 thereof a stub shaft 47 is arranged, which is held against displacement by keys 48, or other suitable retaining devices. Rotatably mounted on the stub shaft 47 between the straps 33 and 34 is a roller 49. When one of the links 32 is arranged in the above described position with the spacing collars 42 at opposite ends thereof disposed on the pads 22 and 24, the roller 49 will be disposed in the bifurcation 30 in the arm 27. It has been pointed out that the outer ends of the bifurcations in the arms 25, 26 and 27, are flared, and this facilitates the guiding of the roller 49 into the bifurcations. When a link is arranged in the above described manner, the roller 49 of the link trailing the above described link will be disposed in the bifurcation 29 of the arm 26, this latter roller being disposed adjacent the outer end of the bifurcation whereas the roller 49 of the first named link will be disposed at or adjacent the inner end of the bifurcation 30. Since each of the links of each of the chains on opposite sides of the machine are interconnected by the shafts 37, it is manifest that the links of opposite chains will be disposed in similar positions, and it is necessary that the sprockets be arranged on the shafts to occupy similar positions. It is, therefore, apparent that links 32 will be extending between pads 22 and 24 in the manner illustrated in Fig. 1, on opposite sides of the machine. Therefore, when the shaft 11 is rotated in a clockwise direction, as viewed in Fig. 1, the engagement of the roller 49 in the bifurcation 30 will cause power to be transmitted to the links 32 disposed in the above described position, and manifestly, therefore, to the chains. The portions of the chains intermediate the sprockets are carried by suitable guideways, generally indicated by 50. As the chain moves around the sprockets, the links successively move out of and into the guideways 50. By reason of the engagement of the spacing collars 42 of the links with the pads at the outer ends of the arms of the sprockets and as the links extend across the sprockets as chords, it is manifest that as successive links move into position the rollers 49 thereon will move into the bifurcations in the arms intermediate the arms carrying the engaged pads. Thus, the links pass around the sprockets in a chordal rather than in a tangential manner, and thus it is manifest that the sprockets may be made of a much smaller diameter than would be possible under tangential engagement of the links. Further, supporting portions are provided for the links, which are independent of the driving connections, and therefore a much more efficient arrangement is provided, and also an arrangement is provided which tends to reduce detrimental wear in the chain. On the bearing sleeves 40, about each of the shafts 37, drums 51, or other suitable storage members, may be supported, and appreciable weight may be arranged on these storage members by reason of the fact that the chain is effectively supported both while passing around the driving sprockets and idler sprockets and when passing through the guideways 50.

While I have illustrated and described a selected embodiment of my invention, it is to be understood that this is capable of variation and modification and I, therefore, do not wish to be limited to the precise details set forth but desire to avail myself of such variations and modifications as fall within the purview of the following claim:

I claim:

In a device of the class described, a chain comprising a plurality of links each embodying a pair of parallel straps, each of said straps having an offset end portion, the offset end portions of said pairs of straps being arranged at corresponding ends of said links and being disposed opposite to each other, the non-offset ends of the straps of the adjacent link overlapping and being arranged inwardly of said offset end portions, the overlapped portions of said straps having alined openings therein, shafts extended through said openings, means spacing the straps of each link from each other on said shafts, means preventing displacement of said straps from said shafts, a roller mounted between the straps of each link and located midway between the shafts at opposite ends of the link, the combination therewith of a sprocket embodying equidistantly spaced radially extending arms having pads at the ends thereof engageable between the straps of each pair of straps at said shafts, and other radially extending arms positioned midway between the equidistantly spaced arms and having bifurcations in the free ends thereof whereby the rollers mounted between said straps engage in said bifurcations, the engagement of said pads between the straps at said shafts guiding the chain about the sprocket and the engagement of said rollers in said bifurcations interconnecting said chain and sprocket for simultaneous movement.

HARRY SUMNER BEST.